United States Patent [19]
Ricks et al.

[11] Patent Number: 5,739,492
[45] Date of Patent: Apr. 14, 1998

[54] HORN SWITCH INCLUDING A TRAPEZOIDAL SHAPED MEMBRANE SWITCH AND SUPPORT PLATE

[75] Inventors: Merle K. Ricks, Layton; Roger T. Lee, Willard, both of Utah

[73] Assignee: Morton International, Inc., Chicago, Ill.

[21] Appl. No.: 651,520

[22] Filed: May 22, 1996

[51] Int. Cl.$^6$ ............................................. H01H 9/00
[52] U.S. Cl. ............................ 200/61.54; 200/5 A
[58] Field of Search .................. 200/5 A, 61.54–61.57, 200/83 R, 86 R, 512–517

[56] References Cited

U.S. PATENT DOCUMENTS

| | | | |
|---|---|---|---|
| 4,194,097 | 3/1980 | Bradam | 200/5 A |
| 4,375,585 | 3/1983 | Lee | 200/5 A |
| 4,460,810 | 7/1984 | Fukukura | 200/5 A |
| 4,497,989 | 2/1985 | Miller | 200/86 R |
| 5,186,490 | 2/1993 | Adams et al. | 280/731 |
| 5,198,629 | 3/1993 | Hayashi et al. | 200/61.54 |
| 5,369,232 | 11/1994 | Leonelli | 200/61.54 |
| 5,399,819 | 3/1995 | Lang et al. | 200/61.54 |

*Primary Examiner*—J. R. Scott
*Attorney, Agent, or Firm*—George W. Rauchfuss, Jr.; Gerald K. White

[57] ABSTRACT

A horn switch support plate for use with a membrane horn switch as part of a horn switch assembly for insertion into a horn switch pocket of a driver side airbag module. The horn switch support plate includes a generally flat, rigid base supporting the horn switch. A substantially continuous peripheral wall extends upwardly from the base, and peripherally encircles the membrane horn switch. The height of the peripheral wall is sized to be greater than the thickness of the horn switch to ensure that the horn switch will not be compressed prior to actuation by a vehicle driver. The horn switch support plate also includes four tabs extending inwardly from and generally perpendicular to four corners of the peripheral wall, each tab extending over, respectively, a corner of the horn switch to retain the horn switch within the horn switch support plate. A plurality of spaced-apart force concentrators extend upwardly from the base to ease actuation of the horn switch, and the height of each force concentrator is less than the difference between the height of the peripheral wall and the thickness of the horn switch. Alternatively, in place of the four tabs, the horn switch support plate can include four slots defined by the peripheral wall receiving the four corners of the horn switch.

19 Claims, 4 Drawing Sheets

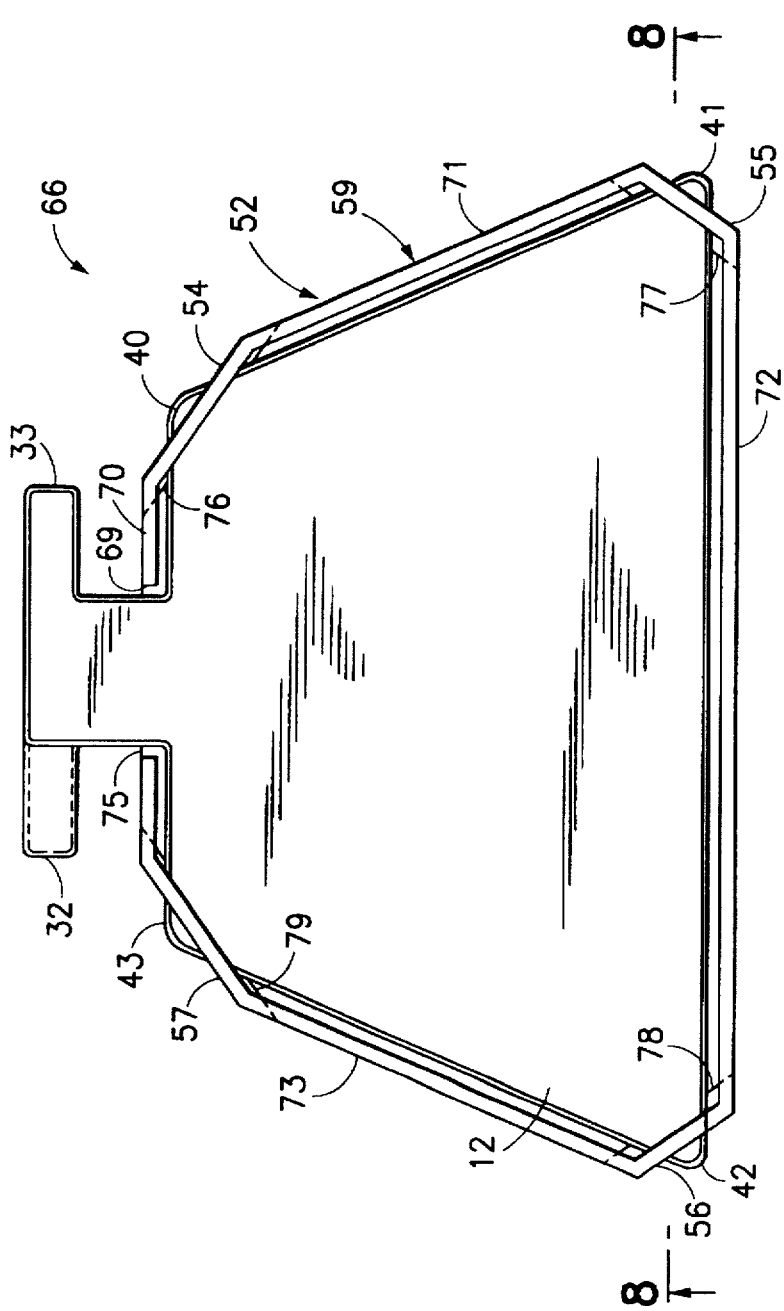
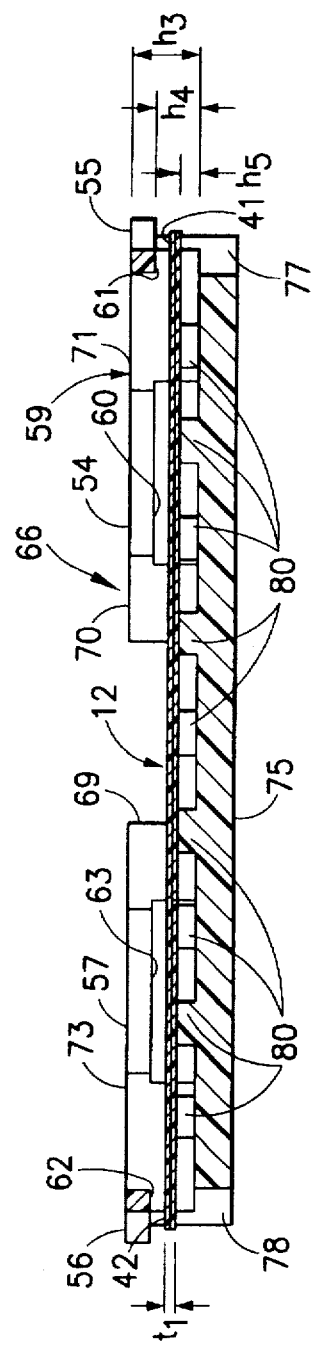
FIG. 7
FIG. 8

HORN SWITCH INCLUDING A TRAPEZOIDAL SHAPED MEMBRANE SWITCH AND SUPPORT PLATE

FIELD OF THE INVENTION

The present invention relates to a horn switch assembly and, more particularly, to a horn switch support plate for use with a horn switch assembly adapted for insertion into a horn switch pocket of a driver side airbag module.

BACKGROUND OF THE INVENTION

Driver side airbag modules, which include an airbag cushion and an airbag module cover, are normally positioned within a hub of a steering wheel of a motor vehicle. The hub of the steering wheel also happens to be the same area which conventionally includes a horn switch. Accordingly, the airbag module cover must additionally serve to actuate the horn switch.

A horn switch assembly normally includes a horn switch and a backing plate attached to an inner surface of a horn actuation face of the airbag module cover. A number of horn switch designs have included a membrane type horn switch which comprise two very thin sheets having conductive coatings which are normally separated by thin spacers. Pressure on the switch pushes the conductive surfaces together to close a circuit and actuate a remote horn. Pressure is applied to the horn switch by the airbag module cover in the hub of the steering wheel, which is depressed by the driver. The horn switch and backing plate are usually attached to the inner surface of the airbag module cover by ultrasonic welding or heat staking.

Heat staking, however, has been found to be a time consuming assembly process that increases the cost of manufacturing the airbag module. In addition, the horn switch is sometimes damaged by heat staking, requiring the replacement of the horn switch and the airbag module cover. A horn switch assembly heat staked to the airbag module cover requires replacing the entire airbag module cover when replacing damaged or defective horn switches. Furthermore, heat staking puts constraints on the design, material and manufacture of the airbag module cover.

To avoid having to mount a horn switch by heat staking or welding, there has been proposed a horn switch pocket formed within an airbag module cover or attached to an airbag cushion or a cushion strap in the airbag module. The horn switch pocket is for receiving and holding the horn switch against the inner surface of the horn actuation area of the airbag module cover. A horn switch contained in a horn switch pocket, however, requires some form of a rigid base to be compressed against. In addition, a horn switch contained within the horn switch pocket and tightly packed between a folded airbag cushion and the airbag module cover is susceptible to inadvertent actuation due to being compressed by thermal expansion or contraction of the airbag module cover, for example, prior to the module cover being depressed by a vehicle driver.

An object, therefore, of the present invention is to provide a horn switch assembly that does not have to be heat staked or ultrasonically welded to the airbag module cover.

Another object of the present invention is to provide a horn switch assembly that is easily assembled to an airbag module and easily removed for servicing or replacement.

An additional object of the present invention is to provide a horn switch assembly for mounting within a horn switch pocket of an airbag module.

A further object of the present invention is to provide a horn switch assembly that accommodates the horn switch so that the horn switch is not compressed, by thermal expansion or contraction of the cover for example, prior to the module cover being depressed by a vehicle driver.

Still another object of the present invention is to provide a horn switch assembly that provides a rigid base for the horn switch.

Yet an additional object of the present invention is to provide a horn switch assembly having a plurality of force concentrators for transferring driver applied pressure more efficiently to the horn switch.

SUMMARY OF THE INVENTION

In carrying out this invention there is provided a horn switch support plate for use with a horn switch as part of a horn switch assembly for inserting into a horn switch pocket adjacent an airbag module cover, whereby the horn switch assembly does not have to be heat staked to the airbag module cover and can be easily inserted for assembly and removed for repair or replacement. The horn switch support plate includes a generally flat, rigid base for supporting the horn switch. A peripheral wall extends upwardly from and generally perpendicular to the base, and the peripheral wall is sized and adapted to peripherally retain the horn switch. The wall has a height that is sized to be greater than a thickness of the horn switch so that the horn switch will not be compressed prior to the switch cover panel being depressed by a vehicle driver. The horn switch support plate also includes means for retaining the horn switch within the peripheral wall. According to one aspect of the present invention, the peripheral wall is substantially continuous.

According to another aspect of the present invention, the means for retaining the horn switch within the peripheral wall comprises at least one tab extending inwardly from and generally perpendicular to the wall for extending over a portion of the horn switch. The at least one tab is sized to have a thickness that is less than the difference between the height of the peripheral wall and the thickness of the horn switch.

According to an additional aspect of the present invention, the horn switch support plate is for use with a horn switch that is generally trapezoidal, and the base of the horn switch support plate is also generally trapezoidal. The at least two spaced-apart tabs comprise four tabs, each tab for extending over a corner of the horn switch.

According to a further aspect of the present invention, the base defines an opening below each of the four tabs, and the four openings are sized so that each tab is fully accessible from beneath the base.

According to yet another aspect of the present invention, the horn switch support plate further includes a plurality of spaced-apart force concentrators extending upwardly from the base. Each force concentrator has a height sized to be less than the height of the peripheral wall minus the thickness of the horn switch and the thickness of the tabs.

According to still an additional aspect of the present invention, the means for retaining the horn switch within the peripheral wall comprises at least two slots defined by the peripheral wall for receiving, respectively, two separate portions of the horn switch. Each slot has a height that is greater than the thickness of the horn switch.

According to yet another aspect of the present invention, the horn switch support plate is for use with a horn switch that is generally trapezoidal, and the base of the horn switch support plate is also generally trapezoidal. The peripheral wall includes four truncated corners and the at least two slots defined by the peripheral wall comprise four slots defined, respectively, generally at the four truncated corners of the peripheral wall. Each slot is for receiving a corner of the horn switch.

According to still a further aspect of the present invention, the base defines an opening below each slot and the openings are sized so that each slot is fully accessible from beneath the base.

According to yet another aspect of the present invention, the horn switch support plate further includes a plurality of spaced-apart force concentrators extending upwardly from the base. Each force concentrator has a height sized to be less than the height of the slots minus the thickness of the horn switch.

A horn switch assembly according to the present invention, for mounting in a horn switch pocket adjacent an airbag module cover is also provided. The assembly includes a horn switch and a horn switch support plate, such as one of the horn switch support plates describe above. The horn switch is for closing a horn switch circuit to activate a remote vehicle horn upon being compressed, and according to one aspect of the present invention, the horn switch is a membrane horn switch.

The invention together with further objects, features, advantages and aspects thereof, will be more clearly understood from the following description taken in connection with the accompanying drawings.

BRIEF DESCRIPTION OF THE DRAWINGS

FIG. 7 is a top plan view of a horn switch assembly according to the present invention including a horn switch and the horn switch plate of FIGS. 5 and 6; and FIG. 8 is a cross sectional view of the horn switch assembly taken along the line 8—8 of FIG. 7.

The same reference numerals refer to the same elements throughout the various figures.

DETAILED DESCRIPTION OF THE INVENTION

Figure 1:
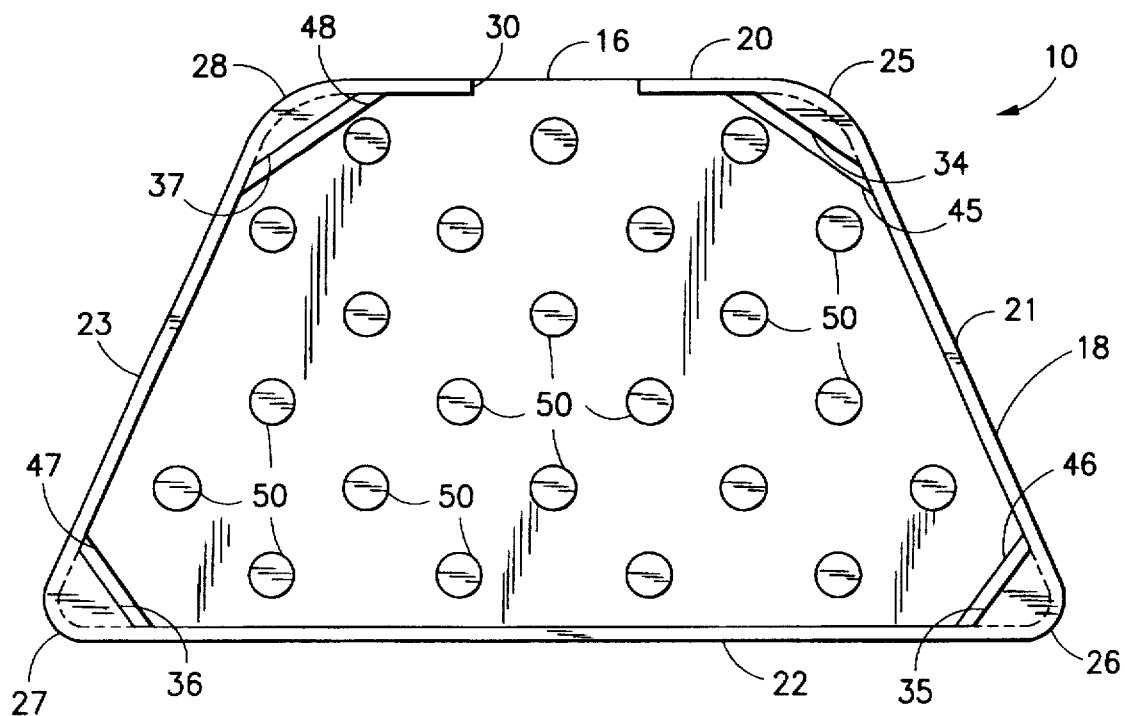
FIG. 1 is a top plan view of a horn switch plate according to the present invention.

Referring first to FIGS. 1 through 4, the present invention is directed to a horn switch support plate 10 for use with a membrane horn switch 12 as part of a horn switch assembly 14. The horn switch assembly is for insertion into a horn switch pocket adjacent an airbag module cover of a driver side airbag module (not shown) which is mounted in the hub of an automobile steering wheel. A horn switch pocket containing the horn switch assembly 14 is positioned tightly between a folded airbag cushion and the airbag module cover of the airbag module, and the membrane horn switch 12 is then actuated by a driver pushing on a horn actuation face of the airbag module cover.

The membrane horn switch 12 is generally trapezoidal. Membrane horn switches are known to those skilled in the art and an example of a membrane horn switch is shown and described in U.S. Pat. No. 5,369,232. Generally, the membrane horn switch comprises two very thin sheets of flexible substrate having conductive coatings thereon which are separated by thin spacers. Pressure on the membrane horn switch pushes the conductive coatings together to close a horn control circuit that the membrane horn switch is connectable to in order to actuate a remote horn.

The horn switch support plate 10 includes a generally flat, rigid base 16 supporting the horn switch. As shown, the base 16, like the membrane horn switch 12, is generally trapezoidal. The base 16, however, is not limited to having a generally trapezoidal shape, and the shape of the base can be varied to match a horn switch that is any shape, such as square, round or oval for example. The base 16 may also curve somewhat to match the curvature of the airbag module cover. The base 16 has a suitable thickness t2 and is made from a light weight and rigid material, preferably a thermoplastic such as polycarbonate for example.

A substantially continuous peripheral wall 18 is unitary with and extends upwardly from and generally perpendicular to the base 16. The peripheral wall 18 peripherally retains the membrane horn switch 12 above the base 16 and includes four sides 20,20,22,23 connected by four corners 25,26,27,28. The peripheral wall 18 is sized to be peripherally larger than the horn switch 12 so that there is a small space between the horn switch and the peripheral wall, and the horn switch is loosely retained by the peripheral wall. A break 30 is defined by the peripheral wall 18 through which extend two electrical leads 32,33 of the horn switch 12 for connection to a horn control circuit.

The horn switch support plate 10 also includes means for retaining the horn switch 12 within the peripheral wall 18, and the means comprises four tabs 34,35,36,37 unitary with, and extending inwardly from the four corners 25,26,27,28 of the peripheral wall, generally perpendicular to the peripheral wall. Each tab 34,35,36,37 extends over, respectively, a corner 40,41,42,43 of the horn switch 12, so that the horn switch is held between the tabs, the peripheral wall 18 and the base 16.

During assembly of the horn switch assembly 14, the horn switch 12 is simply folded or bent slightly so that the corners 40,41,42,43 of the horn switch can be slipped under the tabs 34,35,36,37. The tabs 34,35,36,37 retain the horn switch 12 within the horn switch support plate 10 prior to insertion of the horn switch assembly 14 into a horn switch pocket. The tabs, alternatively, can extend from parts of the peripheral wall other than the corners, as long as each tab extends over at least a portion of the horn switch. A horn switch support plate according to the present invention can include less than or more than four tabs, but should include at least two spaced-apart, generally opposing tabs. In addition, a single tab running substantially along the length of the peripheral wall can be provided.

The base 16 preferably defines four openings 45-48, each opening located below one of the four tabs 34,35,36,37. The openings 45,46,47,48 are sized so that each tab 34,35,36,37 is fully accessible from beneath the base 16 to simplify a mold design for injection molding the horn switch support plate 10.

Figure 2:
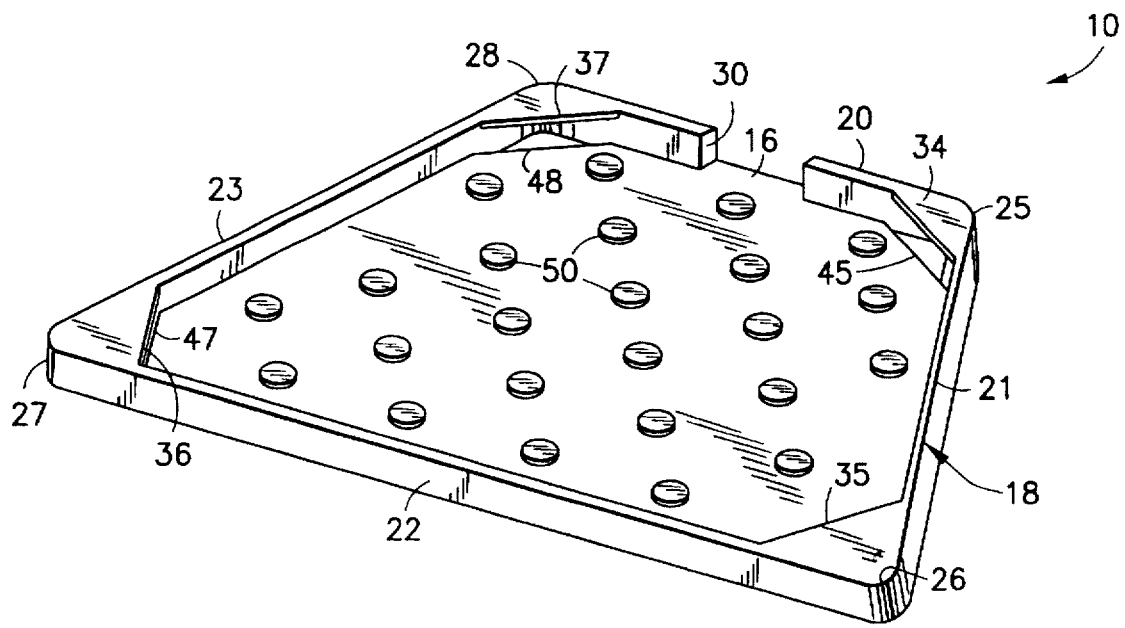
FIG. 2 is a perspective view of the horn switch plate of FIG. 1.
Figure 3:
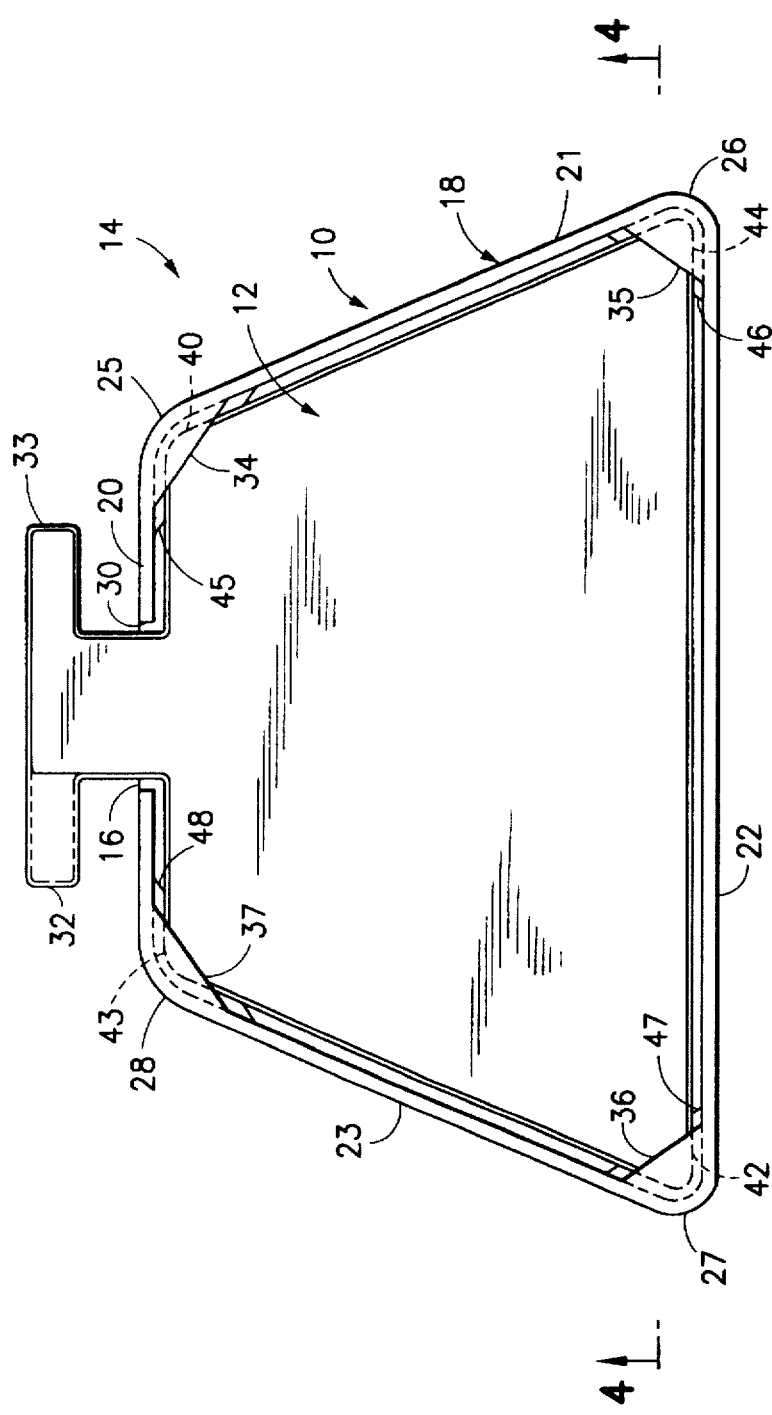
FIG. 3 is a top plan view of a horn switch assembly according to the present invention including a horn switch and the horn switch plate of FIGS. 1 and 2.
Figure 4:
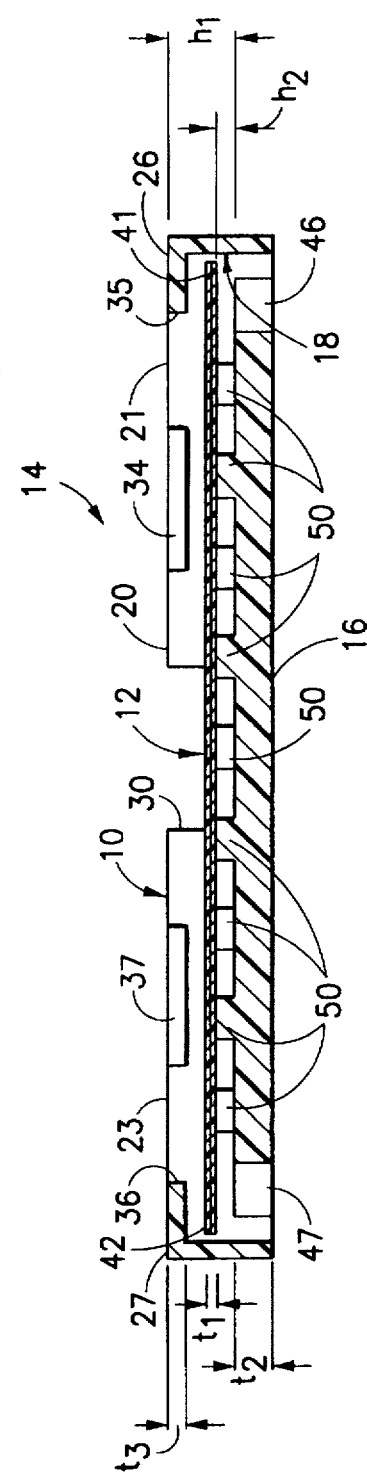
FIG. 4 is a cross sectional view of the horn switch assembly taken along the line 4—4 of FIG. 3.
Figure 5:
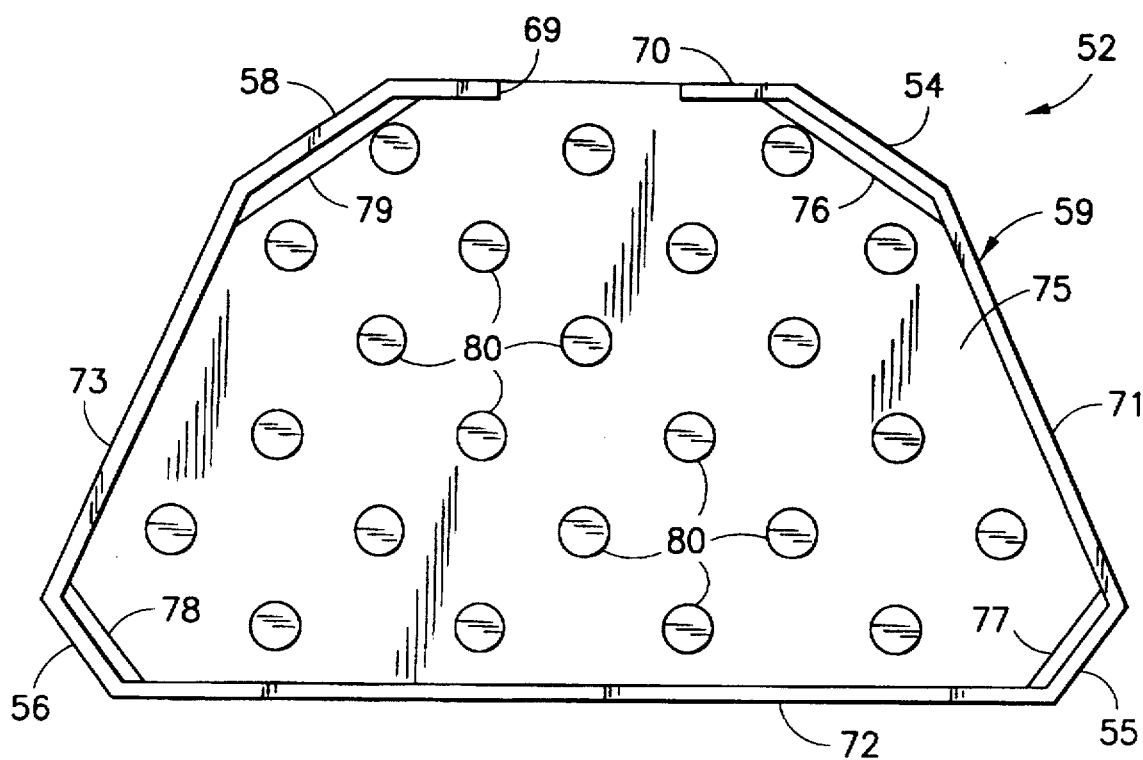
FIG. 5 is a top plan view of another horn switch plate according to the present invention.
Figure 6:
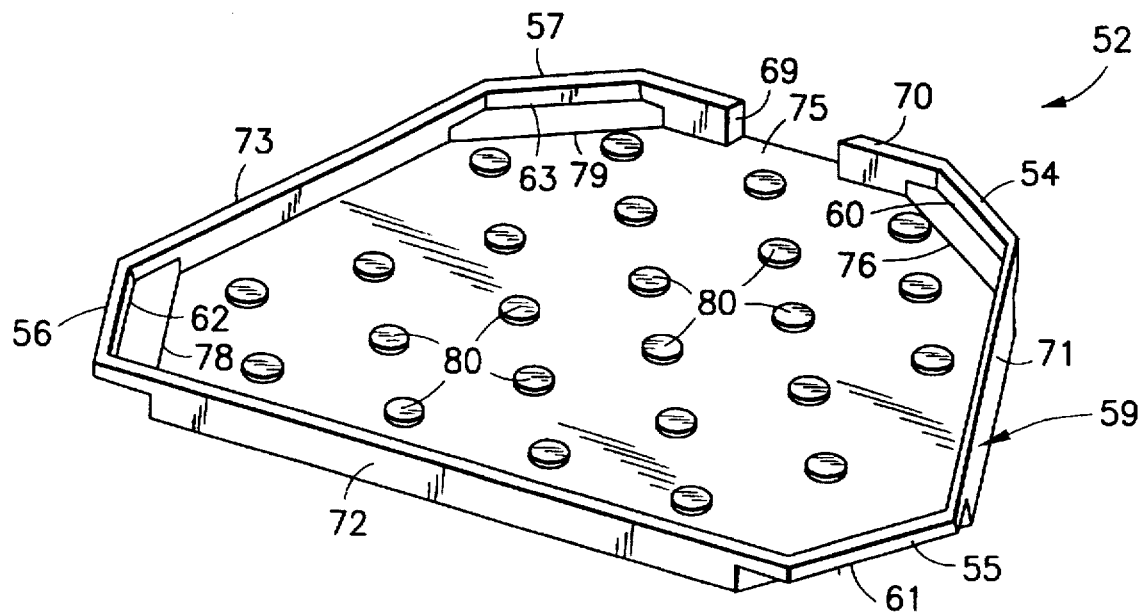
FIG. 6 is a perspective view of the horn switch plate of FIG. 5.

As shown in FIGS. 1,2 and 4, the horn switch support plate 10 can further include a plurality of spaced-apart force concentrators 50 in the form of cylindrical studs unitary with and extending upwardly from the base 16 towards the horn switch 12. The force concentrators 50 may alternatively be provided in any suitable non-cylindrical shapes, such as squares, elongated ribs or X's for example. Any force applied to the horn switch 12 by a vehicle driver is concentrated into a point force against the horn switch by at least one of the plurality of force concentrators 50, easing the actuation of the horn switch.

The peripheral wall 18 has a height h1 above the base 16, that is greater than a thickness t1 of the horn switch 12. The difference between the height h1 of the peripheral wall 18 and the thickness t1 of the horn switch 12 provides an expansion space above the horn switch and ensures that the horn switch will not be compressed, by thermal expansion or contraction of the airbag module cover for example, prior to the airbag module cover being depressed by a vehicle driver. It should be noted that the peripheral wall 18 does not necessarily have to be continuous but can be comprised of a sufficient number of separate segments (at least two or more) as long as the peripheral wall segments retain the horn switch 12 over the base 16 and provide an expansion space above the horn switch.

The four tabs 34,35,36,37 are equal with a top edge of the peripheral wall 18 and each of the four tabs has a thickness t3 that is less than the difference between the height h1 of the peripheral wall 18 and the thickness t1 of the horn switch 12 (t3<h1−t1). The tabs 34,35,36,37, therefore, do not clamp the earners 40,41,42,43 of the horn switch 12, but prevent the horn switch from escaping from within the peripheral wall 18. In addition, each of the force concentrators 50 has a height h2 that is less than the difference between the height h1 of the peripheral wall 18 and both the thickness t1 of the horn switch 12 and the thickness t3 of one of the four tabs 34,35,36,37 (h2<h1−t1−t3), again, to ensure that the horn switch will not be compressed prior to the airbag module cover being depressed by a vehicle driver. In FIG. 4, the thickness t1 of the horn switch 12, the thickness t2 of the base 16, the thickness t3 of the four tabs 34,35,36,37, the height h1 of the peripheral wall 18 and the height h2 of the plurality of force concentrators 50 are shown larger than actual for purposes of illustration.

As an example, the thickness t2 of the base 16 can be about 0.08 inches (2.0 millimeters), the thickness t1 of the membrane horn switch 12 can be about 0.02 inches (0.5 millimeters), the height h1 above the base 16 of the peripheral wall 18 can be about 0.12 inches (3.0 millimeters), the thickness t2 of each of the four tabs 34,35,36,37 can be about 0.04 inches (1.0 millimeters), and the height h2 of each of the force concentrators 50 can be about 0.02 inches (0.5 millimeters).

Referring to FIGS. 5 through 8, another horn switch support plate 52 according to the present invention for use with the membrane horn switch 12 as part of a horn switch assembly 66 is shown. The horn switch assembly 66 and horn switch support plate 52 of FIGS. 5 through 8 are similar to the horn switch assembly 14 and horn switch backing plate 10 of FIGS. 1 through 4, and elements that are the same have the same reference numeral.

The horn switch support plate 52 includes a generally flat, rigid base 75 that is generally trapezoidal and has four truncated corners 76,77,78,79. A substantially continuous peripheral wall 59 is unitary with and extends upwardly from and generally perpendicular to the base 75. The peripheral wall 59 peripherally retains the membrane horn switch 12 above the base 75 and includes four sides 70,71,72,73 connected by four truncated corners 54,55,56,57. A break 69 is defined by the peripheral wall 59 through which extend the two electrical leads 32,33 of the horn switch 12. The peripheral wall 59 has a height h3 above the base 75, that is greater than the thickness t1 of the horn switch 12.

In place of the four tabs 34,35,36,37 of FIGS. 1 through 4, the means for retaining the horn switch 12 within the peripheral wall 59 comprises four slots 60,61,62,63 defined by the peripheral wall, respectively, generally at the four truncated corners 54,55,56,57. Each slot 60,61,62,63 receives one of the four corners 40,41,42,43 of the horn switch 12, and the slots have a height h4 that is greater than the thickness t1 of the horn switch so that the horn switch is not compressed against the base 75 prior to actuation by a vehicle driver. The four truncated corners 54,55,56,57 of the peripheral wall 59 extend beyond the four truncated corners 76,77,78,79 of the base 75 so that the four truncated corners in effect comprise openings located below the four slots 60,61,62,63. The four slots 60,61,62,63 therefore, are fully accessible from below the base 75 to simplify a mold design for injection molding the horn switch support plate 52.

The horn switch support plate 52 can further include a plurality of spaced-apart force concentrators 80 in the form of cylindrical studs unitary with and extending upwardly from the base 75 towards the horn switch 12. The force concentrators 80 have a height h5 that is less than the difference between the height h4 of the slots 60,61,62,63 and the thickness t1 of the horn switch 12.

Alternatively, a horn switch support plate according to the present invention can have slots positioned along the sides of the peripheral wall and a horn switch can include portions other than corners of the horn switch for insertion into the slots. A horn switch support plate according to the present invention can also include less than or more than four slots, but should include at least two spaced-apart, generally opposing slots. In addition, a horn switch support plate according to the present invention can include a combination of tabs and slots.

The present invention, accordingly, provides horn switch assemblies that are self-contained and can be easily inserted into a horn switch pocket of an airbag module, as opposed to being heat staked or welded to an airbag module cover. The horn switch assemblies are easily assembled to the airbag module and easily removed for servicing or replacement.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. A horn switch support plate for use with a horn switch as part of a horn switch assembly for inserting into a horn switch pocket of an airbag module, the horn switch support plate comprising:
 a generally flat, rigid base for supporting the horn switch;
 a peripheral wall extending upwardly from and generally perpendicular to the base, the peripheral wall sized and adapted to peripherally retain the horn switch over the base, the wall having a height sized to be greater than a thickness of the horn switch; and
 means for retaining the horn switch within the peripheral wall.

2. The horn switch support plate of claim 1 wherein the peripheral wall is substantially continuous.

3. The horn switch support plate of claim 1 wherein the means for retaining the horn switch within the peripheral wall comprises at least one tab extending inwardly from and generally perpendicular to the wall for extending over a portion of the horn switch, the at least one tab sized to have a thickness less than the difference between the height of the peripheral wall and the thickness of the horn switch.

4. The horn switch support plate of claim 3 for use with a horn switch that is generally trapezoidal, wherein:

the base is generally trapezoidal; and the at least one tab comprises four tabs, each tab for extending over a corner of the horn switch.

5. The horn switch support plate of claim 4 wherein the base defines an opening below each of the four tabs, the four openings sized so that each tab is fully accessible from beneath the base.

6. The horn switch support plate of claim 5 further comprising a plurality of spaced-apart force concentrators extending upwardly from the base, each force concentrator having a height sized to be less than the height of the peripheral wall minus both the thickness of the horn switch and the thickness of one of the tabs.

7. The horn switch support plate of claim 1 wherein the means for retaining the horn switch within the peripheral wall comprises at least two slots defined by the peripheral wall for receiving, respectively, two separate portions of the horn switch, each slot having a height greater than the thickness of the horn switch.

8. The horn switch support plate of claim 7 for use with a horn switch that is generally trapezoidal, wherein:

the base is generally trapezoidal; and the peripheral wall includes four truncated corners and the at least two slots defined by the peripheral wall comprise four slots defined, respectively, generally at the four truncated corners of the peripheral wall, each slot for receiving a corner of the horn switch.

9. The horn switch support plate of claim 8 wherein the base defines an opening below each slot, the four openings sized so that each slot is fully accessible from beneath the base.

10. The horn switch support plate of claim 9 further comprising a plurality of spaced-apart force concentrators extending upwardly from the base, each force concentrator having a height sized to be less than the height of the slots minus the thickness of the horn switch.

11. A horn switch assembly for mounting in a horn switch pocket adjacent an airbag module cover of an airbag module, the assembly comprising:

A) a horn switch for closing a horn switch circuit to activate a remote vehicle horn upon being compressed; and B) a horn switch support plate including:

a generally flat, rigid base supporting the horn switch;

a peripheral wall extending upwardly from and generally perpendicular to the base, the peripheral wall peripherally retaining the horn switch, the wall having a height greater than a thickness of the horn switch so that when the horn switch assembly is contained in a horn switch pocket adjacent an airbag module cover, the horn switch will not be compressed prior to a vehicle driver pressing on the airbag module cover; and means retaining the horn switch within the peripheral wall.

12. The horn switch assembly of claim 11 wherein the horn switch comprises a membrane horn switch.

13. The horn switch assembly of claim 11 wherein the peripheral wall is substantially continuous.

14. The horn switch assembly of claim 11 wherein the means retaining the horn switch within the peripheral wall of the horn switch support plate comprises at least one tab extending inwardly from and generally perpendicular to the wall and extending over a portion of the horn switch, the at least one tab having a thickness less than the difference between the height of the peripheral wall and the thickness of the horn switch.

15. The horn switch assembly of claim 14 wherein:

the horn switch is generally trapezoidal;

the base of the horn switch support plate is generally trapezoidal; and the at least one tab comprises four tabs extending, respectively, over four corners of the horn switch.

16. The horn switch assembly of claim 15 wherein the horn switch support plate further comprises a plurality of spaced-apart force concentrators extending upwardly from the base, each force concentrator having a height less than the height of the peripheral wall minus both the thickness of the horn switch and the thickness of one of the tabs.

17. The horn switch assembly of claim 11 wherein the means retaining the horn switch within the peripheral wall of the horn switch support plate comprises at least two slots receiving, respectively, two separate portions of the horn switch, each slot having a height greater than the thickness of the horn switch.

18. The horn switch assembly of claim 17 wherein:

the horn switch is generally trapezoidal;

the base of the horn switch support plate is generally trapezoidal; and the peripheral wall includes four truncated corners and the at least two slots defined by the peripheral wall comprise four slots defined, respectively, generally at the four truncated corners of the peripheral wall, each slot receiving a corner of the horn switch.

19. The horn switch assembly of claim 18 wherein the horn switch support plate further comprises a plurality of spaced-apart force concentrators extending upwardly from the base, each force concentrator having a height less than the height of the slots minus the thickness of the horn switch.

* * * * *